United States Patent Office 3,433,312
Patented Mar. 18, 1969

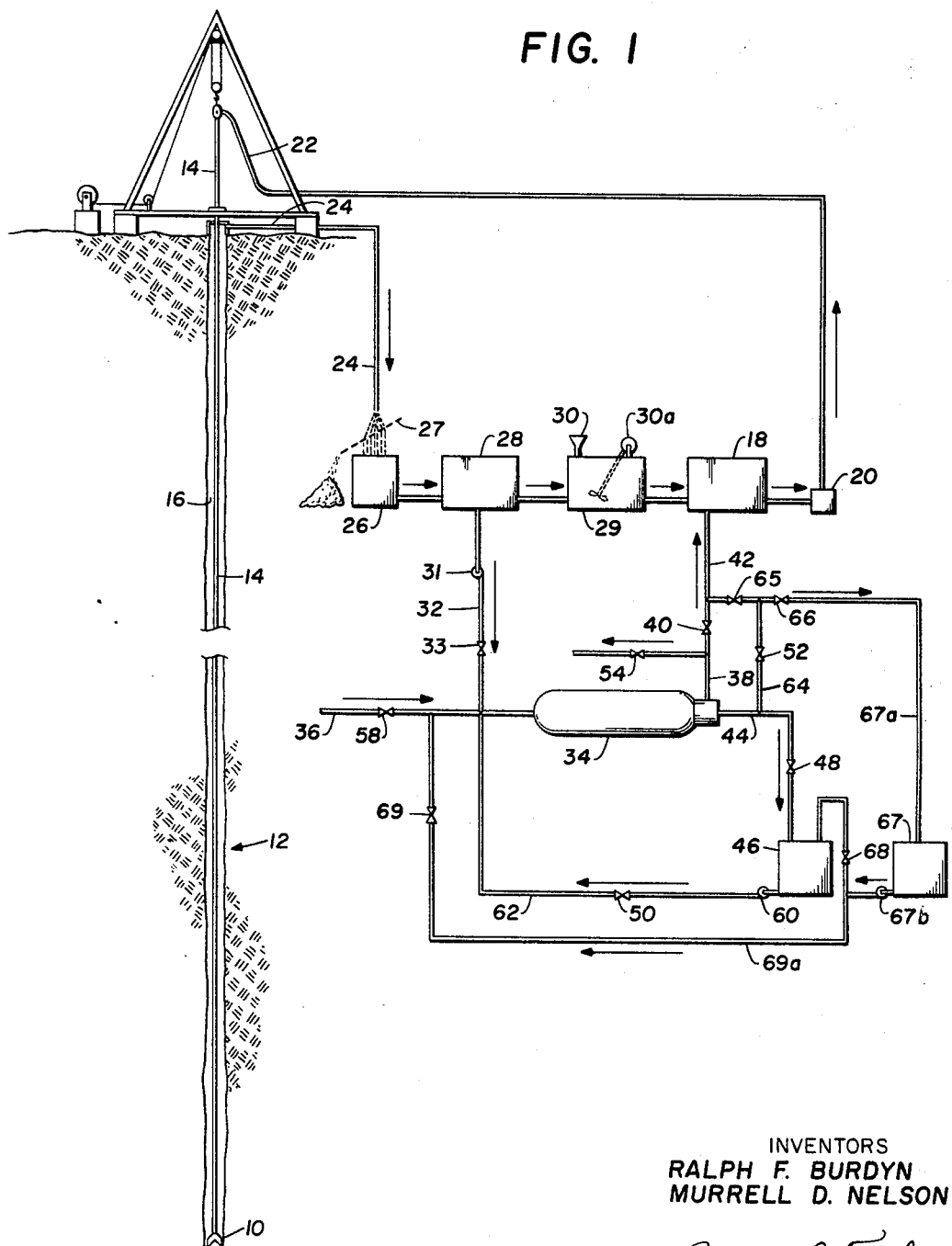

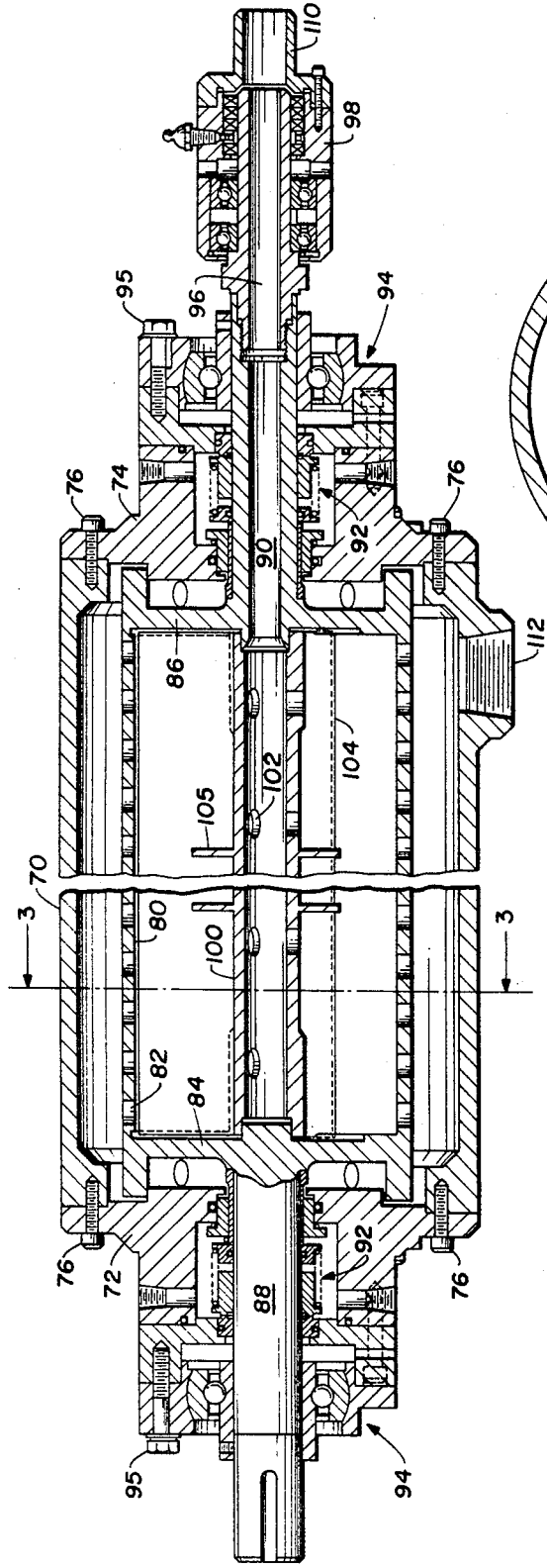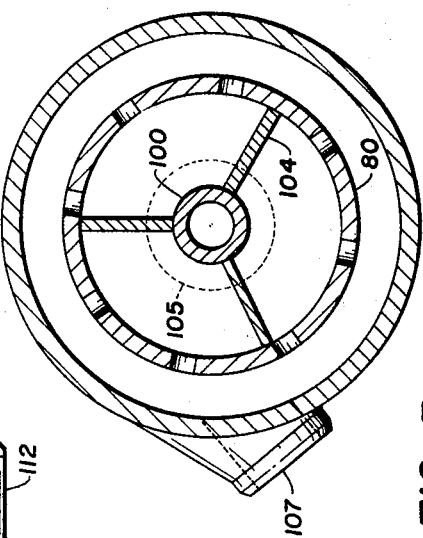

3,433,312
PROCESS FOR RECOVERING VALUABLE COMPONENTS FROM DRILLING FLUID
Ralph F. Burdyn, Dallas, and Murrell D. Nelson, Arlington, Tex., assignors to Mobil Oil Corporation, a corporation of New York
Filed June 1, 1967, Ser. No. 642,740
U.S. Cl. 175—66   16 Claims
Int. Cl. E21b 21/04; E21c 7/08

ABSTRACT OF THE DISCLOSURE

This specification discloses a method of recovering and using a valuable heavy solids phase and a valuable fine solids phase from a drilling fluid being used to drill a well into subterranean formations. The method comprises the steps of: (a) running a portion of the drilling fluid through a particle segregator and effecting a separation of the portion of the drilling fluid into two streams; one, an underflow containing the heavy solids phase and, the second, a low density effluent containing an intermediate solids phase and the fine solids phase, (b) returning the heavy solids phase to the drilling fluid being circulated, (c) subsequently treating the low density effluent to separate the intermediate solids phase therefrom, and (d) employing the fine solids phase to control the properties of the drilling fluid being circulated. The subsequent treatment of step (c) preferably comprises rerunning the low density effluent through a particle segregator operating under conditions effecting separation of the low density effluent into an underflow containing the intermediate solids phase and an effluent containing the fine solids phase. The treatment of step (c), however, may comprise adding a flocculant and subsequently separating the flocculated intermediate solids from the low density effluent. Furthermore, both (1) the step of rerunning the low density effluent through the particle segregator and (2) the addition of a fluocculant and separation of a solids phase may be employed as the treatment of step (c).

Background of the invention

This invention relates to a method of recovering valuable components from a drilling fluid and returning these valuable components to the drilling fluid being used to drill a well into subterranean formations.

As is well known, drilling fluids are employed when drilling holes into subterranean formations. The drilling fluids have the primary purposes of: (1) cooling the bit, (2) carrying the cuttings away from beneath the bit, and (3) keeping the bottom of the borehole cleaned of these cuttings. The most generally applicable drilling fluids and those to which this invention relates are suspensions of solids in liquids, ordinarily called drilling mud or simply mud. The drilling fluids contain large, dense, solid particles in order to impose adequate hydrostatic head to prevent "blowouts." In blowouts, fluids occupying a subterranean formation, under pressure, pass into the wellbore, up the wellbore, and out at the surface. The large, dense, solid particles, usually barite, in the drilling fluid are referred to generally and herein as the heavy solids and a slurry thereof is referred to as the heavy solids phase. Further, the drilling fluids must have the property of thixotropy such that if circulation is interrupted, the cuttings on the way to the surface do not fall back into the well and stick the bit so as to prevent further rotation or movement thereof. Additionally, the drilling fluids must have a low filter loss so the liquid component is not lost into permeable subterranean formations, resulting in thick filter cakes that block the well-bore. Each of these properties requires the addition to the drilling fluid of valuable chemicals and, often, some small, low density clay particles such as bentonite. The small, low density clay particles are referred to generally and herein as fine clay particles. Morever, the drilling fluid must remain pumpable at high temperatures and have other specific characteristics well known in the drilling fluid art. These characteristics also require the addition of other valuable chemicals to the drilling fluid.

During the drilling operation, the drilling fluid picks up from the cuttings and from the subterranean formation additional intermediate size, low density solids which adversely affect its properties. These intermediate size solids are referred to generally and herein as intermediate solids, and a slurry thereof is referred to as the intermediate solids phase. The intermediate solids are generally siliceous and clayey solids. As the concentration of the intermediate solids increases, treatment of the drilling fluid to maintain its properties becomes increasingly more expensive. Ultimately, a concentration of intermediate solids is reached at which it becomes economically advantageous to discard a portion of the drilling fluid and replace it with water, heavy solids, chemicals, and, where necessary, fine clay particles. The discarded portion of the drilling fluid contains valuable heavy solids, valuable chemicals, and valuable fine clay particles.

Attempts have been made in the past to subject the drilling fluid to centrifugal force in centrifuges to separate the solids and return a part of the solids to the drilling fluid. Single centrifuges, as well as centrifuges in series, have been tried. These attempts have not been altogether successful because the thixotropy of the drilling fluid resists particle settling when the entire drilling fluid stream attains substantially the same velocity in the centrifuge chamber. However, a particle segregator described in a copending application by Ralph F. Burdyn, entitled Method and Apparatus for Particle Segregation, Ser. No. 397,497, filed Sept. 18, 1964, now U.S. Patent No. 3,400,-819, issued Sept. 10, 1968, has made practical the separation of the heavy solids phase from the drilling fluid.

Other attempts have been made to fluocculate the solids from the drilling fluid and allow gravity settling. By its very nature, however, the drilling fluid resists such settling since it is thixotropic and prevents settling of the solids. Furthermore, because the drilling fluid contains a large amount of solids having large surface areas, prohibitively large amounts of flocculants are adsorbed on the solid surfaces and make flocculation prohibitively expensive as an initial treatment.

No processes are presently available which successfully and economically extract from a portion of the drilling fluid the valuable heavy solids phase and the desirable fine solids phase and ultimately return these components to the drilling fluid being circulated in a well while eliminating the undesirable intermediate solids phase. The term "fine solids phase" is employed generally and herein to include: (1) fine solids made up of valuable, fine clay particles, and, unavoidably, some small silica particles and some smaller barite particles, (2) solution of valuable chemicals, and (3) where present, oil, either as a separate or an emulsified phase.

Summary of the invention

In accordance with the invention there is provided a method of treating a drilling fluid, being circulated in a well being drilled into subtereanean formations, containing a valuable heavy solids phase, a detrimental intermediate solids phase, and a valuable fine solids phase including a valuable chemical solution which recovers the valuable phases and only discards the detrimental phase. The method comprises:

(a) Running a portion of the drilling fluid through a particle segregator and effecting a separation of the portion of the drilling fluid into two streams; one, an underflow containing the heavy solids phase and, the second, a low density effluent containing the intermediate solids phase and the fine solids phase, (b) Returning the heavy solids phase to the drilling fluid being circulated, (c) Subsequently treating the low density effluent to eliminate therefrom the intermediate solids phase, and (d) Employing the fine solids phase of the low density effluent further in controlling the properties of the drilling fluid being circulated.

When a portion of the drilling fluid is run through a particle segregator and separated into the two streams, the drilling fluid is subjected, within a chamber, to a pressure gradient sufficient to cause a rate of flow thereof and to pass a part of the portion of the drilling fluid being treated through a centrifugal force field and permeable boundary generated by a perforated cylinder spinning at a rate sufficient to separate the drilling fluid, at the rate of flow, into the underflow containing the heavy solids phase and into the low density effluent containing the intermediate solids phase and the fine solids phase.

Preferably, the treating performed in step (c) comprises rerunning the low density effluent through the particle segregator operating under conditions and in accordance with the basic formula described hereinafter to separate the low density effluent into two streams, an underflow containing the intermediate solids phase and an effluent containing the fine solids phase.

The employing of the fine solids phase of the low density effluent in step (d) may comprise returning it to the drilling fluid being circulated or it may comprise recycling it to dilute any portion of the drilling fluid being treated. Ordinarily, a part of the fine solids phase will be returned to the drilling fluid being circulated and a part will be used, with or without intermediate storage, to dilute a portion of the drilling fluid being treated, as described hereinafter.

While the pressure gradient may vary within the chamber in the particle segregator, satisfactory results can be obtained by controlling the pressure differential between the inlet stream and the outlet streams.

*Brief description of the drawings*

FIGURE 1 shows a schematic representation of a drilling well employing the method of the invention.

FIGURE 2 is a longitudinal section taken through the particle segregator.

FIGURE 3 is a transverse section taken along line 3—3 of FIGURE 2.

*Description of specific embodiments*

The operation of a preferred embodiment of the invention and its environment is illustrated in the following description with particular reference to FIGURE 1. Therein, well 10 is being drilled into subterranean formation 12 while a drilling fluid is being circulated downward through drill string 14 and back up the annular space 16 between the wall of the well and the drill string 14. To be circulated downward through drill string 14, the drilling fluid is picked up from suction tank 18 by mud pump 20 and circulated through hose 22 and into drill string 14. After the drilling fluid has been circulated through the well and picked up cuttings from the bottom of the borehole, it returns to the surface and exits through pipe 24 into said box 26, depositing the large cuttings onto the shale shaker screen 27. The drilling fluid then flows from the sand box 26 into settling tank 28 and thence to the suction tank 18 to complete the cycle. Intermediate mixing tanks 29, hoppers 30, and agitators 30a may be employed to facilitate adding requisite chemicals and other components.

In employing the invention, a portion of the drilling fluid is withdrawn from settling tank 28 by pump 31 and flowed through line 32 and open valve 33 to particle segregator 34, frequently called a mud separator. Initially, additional water is pumped through line 36 to dilute the drilling fluid to assist in making the separation in particle segregator 34. As discussed hereinafter, a portion of the fine solids phase may be employed as diluent when it is available. The amount of dilution may be determined empirically. Usually, 0.3 to 3.0 volumes of diluent per volume of the portion of the drilling fluid being treated is adequate. However, no more than 2.0 volumes of water should be employed per volume of drilling fluid being treated.

The portion of the drilling fluid passing to the particle segregator is caused to flow within a chamber in the particle segregator under a pressure gradient longitudinally along a centrifugal force field and permeable boundary generated by a spinning perforated cylinder described in more detail hereinafter. The pressure gradient is also imposed across the centrifugal force field and permeable boundary to pass a portion of the drilling fluid therethrough. In this way, the heavy solids phase flows along the walls of the chamber and exits as underflow from the particle segregator through line 38. Valve 40 is maintained open during this portion of the cycle so the heavy solids phase may be returned through line 42 to suction tank 18 and to the drilling fluid being circulated.

The remainder of the portion of the drilling fluid passing through the centrifugal force field and permeable boundary emerges as a low density effluent through line 44 and into storage tank 46. Valve 48 is maintained open during this operation.

It has been found that employing a given, well-designed particle segregator in this manner requires its operation only about 20 percent of the time. Stated otherwise, employing a good commercial particle segregator at its designed circulation rate about 20 percent of the time is ordinarily adequate to extract the heavy solids phase from the portion of the drilling mud which would otherwise be discarded in order to retain the desired properties in the drilling fluid being circulated.

Accordingly, the particle segregator remains idle approximately 80 percent of the time. During this period of normal idleness, the remaining steps of the preferred embodiment of the invention may be carried out.

Valves 50, 52, 54, and 65, which are normally closed during the foregoing cycle, are opened. Valves 40, 48, 33, and 66 are closed.

The low density effluent which has been stored in storage tank 46 is picked up by pump 60 and circulated through line 62 to particle segregator 34. The amount of water added through line 36 may be reduced by closing down on valve 58. Frequently, it is possible to discontinue addition of water altogether, in which case valve 58 is closed completely. When flowing the low density effluent to the particle segregator, a lower volume throughput and lower pressure gradient are employed, and the perforated cylinder is rotated at a faster rate of revolution to effect separation of the intermediate solids phase from the fine solids phase. Under these conditions, the intermediate solids are unable to penetrate the centrifugal force field, flow along the wall of the chamber, and exit as underflow from the particle segregator, as described in detail hereinafter. Thus, the intermediate solids phase is discharged through line 38 and valve 54 to waste. Conversely, the fine solids phase penetrates the centrifugal force field and the permeable boundary adjacent the spinning perforated cylinder and flows, as effluent phase, through line 44, line 64, and open valves 52 and 65 to return to the drilling mud in suction tank 18.

In lieu of empolying a storage tank and rerunning the low density effluent, a bank of particle segregators connected in parallel may be installed to treat the low density effluent in series with a primary particle segregator removing and returning the valuable heavy solids phase from the drilling fluid. Ordinarily, such a bank of particle segregators is not economically feasible, particularly in view of the fact that on most wells a single particle segregator is not employed full time in removing the heavy solids phase and controlling the properties of the drilling fluid. However, where such a bank of particle segregators is employed to carry out a subsequent treatment of the low density effluent by again subjecting it to the centrifugal force field and permeable boundary: (a) each particle segregator is operated at throughput lower than that of the primary particle segregator and (b) the perforated cylinder therein is rotated at a rate higher than that of the primary particle segregator, as described hereinafter.

In another embodiment of the invention, the low density effluent, having had a large part of its solids removed by the particle segregator, is treated by flocculating the solids therein to increase the average particle size of the suspended solid material and effecting separation of the particles.

The flocculation is effected by addition of suitable flocculants to the low density effluent. Suitable flocculants are well known. They include high molecular weight copolymers of vinyl acetate and of maleic anhydride, high molecular weight polyacrylamide polymers having from 1 to 25 percent of their amide groups hydrolyzed, and high molecular weight polyethylene oxide polymers. The copolymers of vinyl acetate and of maleic anhydride are described by Lummus in an article, "How to Reduce Fine Mud Solids for Better Drilling," The Oil and Gas Journal, Mar. 22, 1965, page 74. The partially hydrolyzed polyacrylamide is available commercially under the trade names of either Aerofloc or Separan. The polyethylene oxide is available commercially under the trade name of Polyox.

A concentration of flocculant is employed which will effect adequate fluocculation, or aggregation, of particles to achieve the desired larger average particle size for subsequent separation. Where the flocculant is chemically incompatible with the drilling fluid being circulated, it is imperative that no more than about 2 percent by weight of the flocculant be added to the low density effluent. Preferably, a concentration of from about 0.01 to about 0.3 percent by weight is employed.

The subsequent separation of the flocculated particles may be effected by sedimentation under quiescent conditions, or by rerunning the low density effluent through the particle segregator operated under appropriate conditions described hereinafter. By rerunning the low density effluent is meant resubjecting the low density effluent to a pressure gradient sufficient to pass a portion thereof through a centrifugal force field and permeable boundary effecting separation of the low density effluent into two streams; an intermediate solids phase designated "underflow" and a fine solids phase as effluent from the particle segregator.

Where separation of the aggregated particles is to be by sedimentation, the low density effluent containing the flocculant is flowed into a suitable storage basin, which may be a tank, and allowed to remain for several hours or more under quiescent conditions to allow the flocculated solids to settle therefrom. After the settling has been effected to the desired degree, the supernatant fine solids phase can be siphoned or pumped therefrom and employed as desired; for example, being returned to the drilling fluid being circulated.

Conventional storage tank, piping, and pumping equipment are employed in flocculation, sedimentation, and subsequent use of the supernatant phase and, hence, are not shown in the figures.

If the separation of the flocculated solids is to be effected by rerunning the low density effluent containing the flocculated solids through the particle segregator, the procedure is carried out in essentially the same manner as described in the preferred embodiment of the invention.

A recycle procedure which we have found useful is to store a portion of a fine solids phase for subsequent use in diluting the inlet stream into the particle segregator. For example, instead of employing water through line 36, the fine solids phase may be employed to dilute the portion of the drilling fluid flowed through line 32 into the particle segregator. The dilution with the fine solids phase is especially beneficial when the fine solids phase is composed primarily of chemical solution which may be prepared as described hereinafter. Also, the fine solids phase may be employed to dilute the low density effluent from the particle segregator before it is subsequently treated. This recycle of a portion of the fine solids phase is particularly advantageous since it prevents dilution of the heavy solids phase or the fine solids phase and reduces the bulk volume being returned to the drilling fluid being circulated.

The recycle procedure is described with reference to FIGURE 1. When the fine solids phase is being returned to the drilling fluid being circulated, valve 65 is open and valve 66 is closed. On the other hand, when the fine solids phase is being sent to storage tank 67 through line 67a, valve 66 is open and valve 65 is closed. The fine solids phase may be sent to storage and may be returned to the drilling fluid being circulated, in any proportion, by throttling flow through valve 65 and valve 66.

When it is desired to dilute any low density effluent stored in tank 46, pump 67b can be employed to pump the fine solids phase into storage tank 46 by closing valve 69, and opening valve 68 to dilute the low density effluent. Valve 68 is otherwise closed. Alternatively, pump 67b can pump the fine solids phase through line 69a when the fine solids phase is being employed to dilute the inlet stream to particle segregator 34. In this event, valve 69 is open or partly open. Otherwise, it is closed. Valve 58 is closed during such recycle to prevent dilution of the inlet stream with water.

Infrequently, it may be desirable to clarify the light solids phase so that only the valuable chemical solution be returned to the drilling fluid or stored for subsequent dilution of a portion of the drilling fluid being treated. In such event, the effluent passing out line 44 from the particle segregator 34 following the rerunning of the low density effluent may be routed to a third storage tank (not shown) and a flocculant added. After two treatments to remove the heavy solids and the intermediate solids, the use of a flocculant to settle substantially all of the solids remaining in the fine solids phase becomes economically feasible.

The flocculated particles are allowed to settle under quiescent storage conditions and the supernatant chemical solution pumped back into the drilling fluid being circulated or used as diluent, with or without intermediate storage. The sediment, composed primarily of the flocculated particles, may be disposed of as waste slurry or employed as a slurry of fine solids in controlling the properties of the drilling fluid being circulated.

As mentioned previously, care should be taken to ensure that any excess flocculant does not adversely affect the drilling fluid when the clear supernatant chemical solution is pumped from the second storage tank and returned to suction tank 18 to rejoin the drilling fluid being circulated.

Ordinarily, this clarification will not be necessary since the fine solids consist primarily of clay particles, and some silica particles having a size of less than about 2 microns, are beneficial, and need not be discarded. In contrast, the intermediate solids consist of silica and some clay particles having a size of from about 2 to about 10 microns, adversely affect the drilling fluid, and should be discarded.

The segregation of particles within the drilling fluid is effected by imposing a pressure differential onto the liquid suspension such that a portion thereof flows as effluent through a centrifugal force field and permeable boundary such as created by a perforated cylinder spinning within a chamber, and the remainder of the liquid suspension which does not penetrate the centrifugal force field and permeable boundary, at the pressure differential imposed, flows as underflow from the chamber. Specifically, the particle segregation is effected in accordance with particle size and density distribution. It is theorized that within the zone along the permeable boundary a relatively thin film is established in which laminar flow exists. In the zone between this thin film and the inner wall of the chamber in which the separation process is carried out, that is, in the space radially outward from the thin film along the permeable boundary, a condition of high turbulence exists. This is to be contrasted with the condition existing in a conventional centrifuge where the entire mass of drilling fluid attains the same velocity as the spinning container and thus tends to gel and resist movement of the particles tending to be thrown to the outside by centrifugal force in much the same way as it resists settling of the particles in the wellbore.

Although the details of construction of a particular particle segregator are not believed necessary, there are certain correlations between the size of the various elements of a particle segregator which make practical segregation of particles into the various phases. These correlations include: (1) the size of openings in relation to the size of the particles in the drilling fluid to be treated and to the diameter of the cylinder being employed in setting up the centrifugal force field and the permeable boundary through which a portion of the drilling fluid is to be passed, (2) the total area of the openings relative to the area of the cylinder, and (3) the length-to-radius ratio of the permeable boundary and centrifugal force field formed by the rotating perforated cylinder.

The elements in the particle segregator are illustrated in FIGURE 2. Therein, outer casing 70 is united with a pair of opposed end members 72 and 74 by cap screws 76 to form a pressure-tight chamber. While the casing is shown as being substantially cylindrical in shape, it may have any other desired configuration. Positioned within the chamber is a rotatable, hollow cylinder 80 provided with a plurality of openings 82 extending through the cylindrical wall and distributed over substantially the entire surface thereof. Openings 82 are preferably evenly distributed over the surface of the cylinder. Cylinder 80 is supported by a pair of solid end plates 84 and 86. End plate 84 is secured to a driven shaft 88 while end plate 86 is secured to a hollow shaft 90. Suitable rotary sealing units, generally designated by reference numeral 92, surround driven shaft 88 and hollow shaft 90 to prevent leakage from the chamber within casing 70. The sealing units may include means for introducing a sealing fluid under pressure greater than that in the chamber into the annulus between each shaft and its respective end member. Suitable bearings, generally designated by reference numeral 94, are of the ball-bearing type and are fastened by cap screws 95 or other suitable means to the end members 72 and 74 to permit free rotation of shafts 88 and 90. A rotating union 96 is threaded to the outer end of shaft 90 and is supported in a coupling 98.

A discharge pipe 100, provided with apertures 102, is supported within the cylinder 80 with one end thereof in communication with the hollow shaft 90. A plurality of vanes 104, illustrated in FIGURE 3, extend radially outwardly from pipe 100 to cylinder 80. The vanes 104 are not physically attached directly to cylinder 80 but are supported by annular braces 105.

Cylinder 80 is rotated at predetermined speeds by suitable means (not shown) to generate the previously mentioned centrifugal force field and permeable boundary through which a part of the drilling fluid being treated is flowed and which in turn imparts centrifugal force to the portion of the drilling fluid immediately surrounding the cylinder.

The drilling fluid to be treated enters the fluidtight chamber at entry port 107, shown in FIGURE 3. Port 107 is mounted off-center and is not illustrated in FIGURE 2. It is not necessary that port 107 be mounted off-center. The portion of fluid and of fine solids flowing through perforations 82, exits as effluent from the interior of cylinder 80 by way of apertures 102 in pipe 100, hollow shaft 90, rotating union 96, and discharge conduit 110. The subsequent handling of this effluent is described under the specific steps elsewhere.

The remainder of the fluid, including the solid particles having a size and weight such that their inward flow momentum due to the pressure differential is overcome by centrifugal force, exits as underflow through a discharge conduit 112 in casing 70 at a controlled rate. Further handling of this underflow passing through discharge conduit 112 is discussed with respect to different steps elsewhere.

The openings 82 should be at least several times as large as the largest particles in the drilling fluid being treated to prevent several particles collectively forming a bridge over an opening and effectively closing off the opening. The forming of a bridge over an opening is called "bridging." It is possible for each of the openings to be several times as large as the largest particles in the drilling fluid being treated because the separation process is not in any way dependent upon a filtering or screening action by the openings in the rotatable cylinder. If the openings are small enough to permit bridging, the apparatus can become inoperative due to particles clogging the openings. Successful operations have been performed where the diameters of the perforations range from as small as $\frac{1}{64}$ inch to as large as $\frac{5}{8}$ inch. The size of the openings which can be usefully employed in a given particle segregator has been found to be contingent upon the diameter of the rotating cylinder. The ratio of the diameter of the openings to the diameter of the cylinder is preferably between about 0.01 and about 0.1. At ratios below the above-mentioned lower limit, the possibility of bridging of the openings is increased. At ratios above the upper limit of the preferred range, the efficiency of the separation is decreased and less barites are recovered or, correspondingly, less intermediate solids are removed. It is theorized that the decreased efficiency results from the larger openings causing irregularities in the boundary layer formed at the surface of the rotating cylinder.

The total area of openings should be from about 5 to 30 percent of the total area of the cylinder, exclusive of the end portion in order to form a boundary which is instantaneously permeable over about 5 to about 30 percent of its area. Preferably, the area of the openings and hence the area of instantaneous permeability of the boundary will be between about 15 and 25 percent of the total cylindrical surface area of the cylinder. While operation outside of these ranges will enable some separation to be effected, the amount of separation achieved is not sufficient to provide a process that is advantageous over known separating processes.

For good operating efficiency, it is preferred that the length-to-radius ratio of the substantially cylindrical, permeable boundary be at least 6 and preferably about 16. Such ratios are preferred since, for a cylinder of given volume, the horsepower required to rotate a perforated cylinder to generate the permeable boundary is directly dependent upon the fourth power of the radius but only the first power of the length. It will thus be appreciated that the power requirements of a cylinder having a length-to-radius ratio in the above-mentioned range will have greatly decreased power requirements when compared, for example, to a segregator of the same throughput wherein the length and diameter of the rotatable cylinder are approximately equal.

It has also been found that for best operation the flow rate of the fluid mixture to the segregator and the flow rate of the streams discharging from the segregator should be maintained fixed relative to the rate of rotation. This may be achieved by the control means and pumps well known to the art and particularly discussed in application Ser. No. 397,497 mentioned previously.

The fluid mixture should also be supplied to the particle segregator at a constant pressure within the range of 15 to 45 p.s.i.g. If, on the other hand, the fluid mixture is supplied by means of a hydrostatic head, a constant rate of flow of the various streams relative to the rotation of the cylinder is not achieved and a less efficient particle separation results. It will be apparent that, while remaining within the preferred ranges of the correlations referred to above, a fairly wide range of designs is possible. For example, in a particular test model wherein the perforated cylinder was 5½ inches long, had an outside diameter of 1½ inches, providing an effective area of 26 square inches, and the perforations were 1/16 inch in diameter, no appreciable variation in efficiency of operation was detected where the cylinder was provided with 200 perforations as compared with a cylinder of the same dimension having a total of 1,580 perforations. However, when the total number of perforations in the cylinder was increased to 3,300 so that the total area of the openings was about 39 percent of the area of the cylinder, the efficiency of the apparatus fell from about 96 percent to approximately 86 percent.

The relationship between the flow rate of drilling fluid and the centrifugal force field to which a part of the drilling fluid must be subjected to effect particle segregation in accordance with predetermined values of size and density is defined by the formula:

$$Q = \pi R^2 L \omega^2 \Delta\rho d^{*2}/9\mu \quad (1)$$

where (in consistent units)

Q = the rate of flow of the effluent stream,
R = the radius of the centrifugal force field and a substantially cylindrical permeable boundary which for design purposes may be assumed to be the radius of a perforated cylinder which will be rotated within a chamber,
L = the length of the centrifugal force field and substantially cylindrical permeable boundary which for design purposes may be assumed to be the length of the perforated portion of the perforated cylinder,
$\omega$ = a factor indicative of the magnitude of the centrifugal force field active to restrict movement of particles to the interior of the substantially cylindrical permeable boundary, and which for design purposes may be assumed to be the angular speed of the perforated cylinder in radians per second,
$\Delta\rho$ = the difference in density between the particles to be separated and the effluent stream,
$d^*$ = the size at which particle segregation is to be effected; that is, the minimum size of the particles to be separated as underflow, or the maximum size of particles having a density equal to that of the particles to be separated, to pass out with the effluent, and
$\mu$ = the viscosity of the effluent stream.

Equation 1 can be expressed in a more convenient, equivalent formula employing engineering units as follows:

$$Q = KR^2LN^2\Delta\rho d^{*2}/\mu \quad (2)$$

where:

$K = 15.97 \times 10^{-12}$, when:

Q is given in gallons per minute,
R is given in inches,
L is given in inches,
N is the factor $\omega$ when that factor is in revolutions per minute instead of radians per second,
$\Delta\rho$ is given in pounds per cubic foot,
$d^*$ is given in microns, and
$\mu$ is given in centipoises.

In accordance with Equation 2, heavy barite particles that are in excess of 5 microns in size may be separated from an effluent stream having a density of 75 pounds per cubic foot under the following conditions:

Q = 10 gallons per minute,
R = 2.85 inches,
L = 42.75 inches,
N = 1060 revolutions per minute (r.p.m.),
$\Delta\rho$ = 193 pounds per cubic foot, and
$\mu$ = 3 centipoises.

Still approximately in accordance with Equation 2 but disregarding decreasing density and viscosity of the effluent stream, the low density effluent may be pumped from the storage tank and rerun to the particle segregator to effect separation of barite particles down to 1 micron in size. Rerunning the low density effluent at the flow rate Q initially employed would require an increase in the rate of revolutions (r.p.m.) by a factor of 5. Since such increase in r.p.m. would require severe design criteria, a more practical approach is ordinarily advisable where Q may be cut by a factor of 5 and the r.p.m. increased by a factor of $\sqrt{5}$ to 2,360 and the desired separation effected.

In rerunning the low density effluent, the primary objective is to eliminate therefrom the silica and clay particles having sizes from about 2 microns to about 10 microns in effective dimensions. Since the differential density of the silica and clay particles is approximately one-half that of the barite, this separation will unavoidably separate the barite particles of size between about 1.4 and about 7.1 microns. These intermediate solids are undesirable and are separated as underflow from the particle segregator.

A particle segregator having a perforated cylinder 2.85 inches in radius and 42.75 inches in length can be run as high as 3,000 r.p.m. without excessive mechanical difficulties and with reasonable power requirements when treating the low density effluent. With an approximation of 97.3 pounds per cubic foot difference in the density of the particles being separated and the density of the effluent from the particle segregator, which effluent has a viscosity of about 2 centipoises, Equation 2 reduces to a simplified version, which is approximately accurate, of $Q = 2.42d^2$. Stated otherwise, silica and clay particles larger than about 2 microns in size may be separated as an intermediate solids phase comprising the underflow from the low density effluent when the low density effluent is caused to flow, under a pressure gradient sufficient to afford an effluent flow rate of up to 9.6 gallons per minute, through the cylindrical, permeable boundary created by the perforated cylinder rotating at 3,000 r.p.m.

On the other hand, when the drilling fluid containing the barite particles is being treated with the same particle segregator, the perforated cylinder can be run as high as 2,300 r.p.m. with about the same power requirements. When the perforated cylinder is run at 2,300 r.p.m., the particle segregator will effect a separation of barite particles above about 5 microns in size from the low density effluent at flow rates Q up to about 47 gallons per minute. As can be seen from a comparison, the flow rate can be much higher during this initial flow through the particle segregator than in the subsequent recycle of the low density effluent. In the examples described, the difference factor is about five times. It may run from about three to about eight times as high depending on the initial and final separation conditions sought.

Having thus described the invention, it will be understood that such description has been given by way of illustration and example and not by way of limitation. The appended claims define the scope of the invention.

What is claimed is:

1. A method of treating a drilling fluid being circulated in a well being drilled into subterranean formations and containing a valuable heavy solids phase, a detrimental intermediate solids phase, and a valuable fine solids phase including a valuable chemical solution, which comprises the steps of:
(a) running a portion of said drilling fluid through a particle segregator and effecting a separation of said portion of said drilling fluid into an underflow containing said heavy solids phase and into a low density effluent containing said intermediate solids phase and said fine solids phase, said separation comprising subjecting said portion of said drilling fluid, within a chamber, to a pressure gradient sufficient to cause a rate of flow thereof, and to pass a portion thereof through a centrifugal force field and permeable boundary generated by a perforated cylinder spinning at a rate sufficient to separate said portion of said drilling fluid at said rate of flow into said underflow containing said heavy solids phase and into said low density effluent containing said intermediate solids phase and said fine solids phase,
(b) returning said heavy solids phase to said drilling fluid being circulated,
(c) subsequently treating said low density effluent to separate therefrom said intermediate solids phase, and
(d) employing said fine solids phase of said low density effluent further in controlling the properties of said drilling fluid being circulated.

2. The method of claim 1 wherein said treating of step (c) comprises running said low density effluent through a particle segregator so that said low density effluent is subjected, within a chamber, to a pressure gradient sufficient to cause a rate of flow thereof, and to pass a portion thereof through a centrifugal force field and premeable boundary generated by a perforated cylinder spinning at a rate sufficient to separate said low density effluent at said rate of flow into an underflow containing said intermediate solids phase, and into an effluent containing said fine solids phase including said chemical solution.

3. The method of claim 2 wherein a flocculant is added to said effluent comprising said fine solids phase after said intermediate solids phase has been separated from said low density effluent, said effluent is stored under quiescent conditions to effect gravity settling of said fine solids and form, as a supernatant liquid, said chemical solution, containing substantially less fine solids, and employing said chemical solution futher in controlling the properties of said drilling fluid being circulated.

4. The method of claim 2 wherein said step (a) and said step (c) to which said drilling fluid and said low density effluent are subjected, respectively, comprises:
(a) imposing within an enclosing chamber a pressure differential across a substantially cylindrical boundary permeable to said drilling fluid to effect passage of a portion of said drilling fluid and said low density effluent inwardly toward said boundary at a rate dependent upon said pressure differential,
(b) creating a zone of rotation at said boundary to impose a centrifugal force field upon said drilling fluid and said low density effluent passing through said boundary, the magnitude of said centrifugal force field being dependent upon the rate of rotation,
(c) regulating said rate of rotation relative to said pressure differential so that the inward flow momentum of each of the particles comprising, respectively, heavy solids in said drilling fluid and intermediate solids in said low density effluent having a size and density above predetermined values will be overcome and said particles will not pass through said boundary but the fine solids in said drilling fluid and in said low density effluent having a size and a density below said predetermined values will pass through said boundary,
(d) withdrawing from said chamber outside of said cylindrical boundary, liquid together with, respectively, said heavy solids and said intermediate solids, and
(e) withdrawing from inside said cylindrical boundary, liquid which has passed through said boundary together with said fine solids.

5. The method of claim 2 wherein said step (a), and said treating of step (c) to which said drilling fluid and said low density effluent, respectively, are subjected is achieved by:
(a) introducing, respectively, said drilling fluid and said low density effluent into a chamber,
(b) subjecting, respectively, said drilling fluid and said low density effluent within said chamber to a pressure differential across a substantially cylindrical boundary created by a spinning perforated cylinder and instantaneously permeable to said drilling fluid over from about 5 percent to about 30 percent of its area without bridging of the largest of solid particles in said drilling fluid to effect passage, respectively, of said drilling fluid and said low density effluent inwardly toward said boundary at a rate dependent upon said pressure differential,
(c) creating a centrifugal force field, whose magnitude is dependent upon the rate of rotation of said spinning perforated cylinder, at said boundary to impose a centrifugal force upon, respectively, said drilling fluid and said low density effluent passing through said boundary.
(d) regulating said rate of rotation relative to said pressure differential so that the inward flow momentum of each of the solid particles comprising, respectively, heavy solids in said drilling fluid and intermediate solids in said low density effluent having a size and a density above predetermined values will be overcome and said solid particles will not pass through said permeable boundary but the fine solids in said drilling fluid and in said low density effluent having a size and a density below said predetermined values will pass through said boundary,
(e) withdrawing from said chamber outside of said cylindrical boundary, respectively, said heavy solids phase and said intermediate solids phase, and
(f) withdrawing from inside said cylindrical boundary said fine solids phase.

6. The method of claim 5 wherein said pressure differential and hence said rate of flow of effluent, said rate of rotation and dimensions of said perforated cylinder, said predetermined values of said size and said density of said heavy solids in said drilling fluid, and said predetermined values of said size and said density of said intermediate solids in said low density effluent are determined in accordance with the following equation:

$$Q = KR^2LN^2 \Delta \rho d^{*2}/\mu$$

where:
K=15.97×10⁻¹²,
Q=the rate of flow of the effluent stream in gallons per minute,
R=the radius in inches of said centrifugal force field and said substantially cylindrical permeable boundary, which is essentially the radius of a perforated cylinder which will be rotated within a chamber,
L=the length in inches of said centrifugal force field and said substantially cylindrical permeable boundary, which is essentially equal to the length of the perforated portion of the perforated cylinder.
N=a factor indicative of the magnitude of the centrifugal force field active to restrict movement of particles to the interior of the substantially cylindrical permeable boundary and essentially the angular speed of the perforated cylinder in revolutions per minute,
Δρ=the difference in density in pounds per cubic foot, respectively, between particles of said heavy solids and said low density effluent, and between particles of said intermediate solids and said effluent of said fine solids phase, $d^*$ = the size in microns at which particle segregation is to be effected; that is, the minimum size of, respectively, said particles of said heavy solids and said particles of said intermediate solids, or the maximum size of particles having a density equal to that of said particles of said heavy solids and said particles of said intermediate solids to pass out with the effluent stream comprising, respectively, said low density effluent and said fine solids phase, and $\mu$ = the viscosity in centipoises of, respectively, said low density effluent and said fine solids phase.

7. The method of claim 5 wherein said pressure differential and said rate of rotation are adjusted to effect separation of heavy solids having a size of more than 5 microns and a density comparable to that of barite from said drilling fluid, and of said intermediate solids having a size of about 2 to 10 microns and a density about equal to that of silica from said low density effluent.

8. The method of claim 7 wherein said intermediate solids have a size of about 2 microns.

9. The method of claim 5 wherein said substantially cylindrical boundary is instantaneously permeable to the passage therethrough of liquid over about 15 to 25 percent of its area without bridging.

10. The method of claim 1 wherein said treating of step (c) comprises adding a flocculant and subsequently separating the flocculated intermediate solids from said low density effluent.

11. The method of claim 10 wherein said subsequent separation of said intermediate solids from said low density effluent is performed by storing said low density effluent and said flocculant under quiescent conditions to effect sedimentation of flocculated intermediate solids and pumping the supernatant fine solids phase from the sediment of said intermediate solids.

12. The method of claim 11 wherein said subsequent separation of said intermediate solids from said low density effluent is effected by rerunning said low density effluent through said particle segregator so that said low density effluent containing flocculated intermediate solids is subjected, within a chamber, to a pressure gradient sufficient to cause a rate of flow thereof and to a centrifugal force field and permeable boundary generated by a perforated cylinder spinning at a rate sufficient to separate said low density effluent containing flocculated intermediate solids into underflow comprising said intermediate solids phase and into an effluent comprising said fine solids phase.

13. The method of claim 1 wherein said employing of said fine solids phase of step (d) comprises returning said fine solids phase to said drilling fluid being circulated.

14. The method of claim 1 wherein said employing of said fine solids phase of step (d) comprises recycling a portion of said fine solids phase to dilute at least a portion of said drilling fluid being treated.

15. The method of claim 1 wherein said employing of said fine solids phase of step (d) comprises both returning said fine solids phase to said drilling fluid being circulated and recycling a portion of said fine solids phase to dilute at least a portion of said drilling fluid being treated.

16. The method of claim 1 wherein said running a portion of said drilling fluid through a particle segregator and effecting said separation in step (a) comprises:

subjecting said portion of said drilling fluid, within a chamber, to a pressure gradient sufficient to cause a rate of flow thereof and to pass a portion thereof through a centrifugal force field and permeable boundary generated by a perforated cylinder spinning at a rate sufficient to separate said portion of said drilling fluid at said rate of flow into an underflow containing said heavy solids phase and into a low density effluent containing said intermediate solids phase and said fine solids phase, and wherein said treatment in step (c) comprises:

running said low density effluent through a particle segregator so that said low density effluent is subjected, within a chamber, to a pressure gradient sufficient to cause a rate of flow thereof, and to pass a portion thereof through a centrifugal force field and permeable boundary generated by a perforated cylinder spinning at a rate sufficient to separate said low density effluent at said rate of flow into an underflow containing said intermediate solids phase, and into an effluent containing said fine solids phase including said chemical solution.

References Cited

UNITED STATES PATENTS

| | | | |
|---|---|---|---|
| 2,225,973 | 12/1940 | Brown et al. | 175—66 X |
| 2,870,990 | 1/1959 | Bergey | 175—66 |
| 2,919,899 | 1/1960 | Marwil et al. | 175—66 |
| 3,016,962 | 1/1962 | Lummus et al. | 175—66 |

OTHER REFERENCES

Anon., "How to Reduce Fine Mud Solids for Better Drilling," The Oil and Gas Journal, Mar. 22, 1965 (pp. 74–77).

Burdyn, "A New Device for Field Recovery of Barite" Society of Petroleum Engineers Journal, June 1965, (pp. 100–108).

STEPHEN J. NOVOSAD, *Primary Examiner.*

UNITED STATES PATENT OFFICE
CERTIFICATE OF CORRECTION

Patent No. 3,433,312                                                    March 18, 1969

Ralph F. Burdyn et al.

It is certified that error appears in the above identified patent and that said Letters Patent are hereby corrected as shown below:

Column 3, line 69, "said box 26" should read -- sand box 26 --. Column 5, line 38, "fluocculation" should read -- flocculation --. Column 11, line 32, "premeable" should read -- permeable --; line 45, "futher" should read -- further --; line 66, before "density" insert -- a --. Column 12, line 26, "boundary." should read -- boundary, --. Column 13, line 19, before "10 microns" insert -- about --; line 38, "The method of claim 11" should read -- The method of claim 10 --. Column 14, line 43, "2,919,899" should read -- 2,919,898 --.

Signed and sealed this 31st day of March 1970.

(SEAL)
Attest:

Edward M. Fletcher, Jr.                                       WILLIAM E. SCHUYLER, JR.
Attesting Officer                                               Commissioner of Patents